J. WARBURG.
SCARF FASTENER.
APPLICATION FILED JUNE 18, 1918.
1,288,317. Patented Dec. 17, 1918.
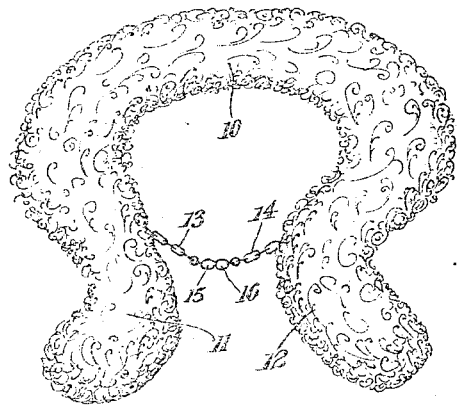
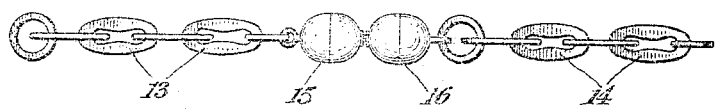
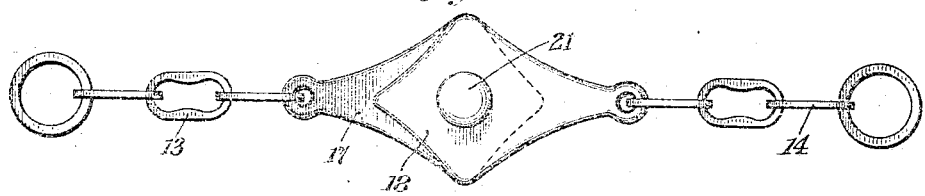
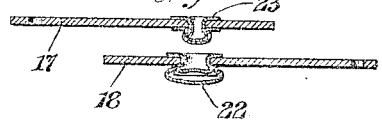
Inventor
Julius Warburg
By his Attorney

UNITED STATES PATENT OFFICE.

JULIUS WARBURG, OF BROOKLYN, NEW YORK.

SCARF-FASTENER.

1,288,317.  Specification of Letters Patent.  Patented Dec. 17, 1918.

Application filed June 18, 1918. Serial No. 240,614.

*To all whom it may concern:*

Be it known that I, JULIUS WARBURG, a citizen of the United States, and a resident of Brooklyn, in the county of Kings and State of New York, have invented certain new and useful Improvements in Scarf-Fasteners, of which the following is a specification.

The invention relates to improvements in means whereby the free end portions of a scarf, boa, fur piece, and the like, may be readily and conveniently secured to each other and in such manner that the same may likewise be quickly and readily separated when desired. It has for its object to provide a device of this character which will be effective in securing the end portions to each other and prevent the frequent annoyance occasioned by the same becoming separated due to defective securing elements or to the improper attachment of the latter to the material composing the body portion of the fastening members carried by the scarf. The device, furthermore, is designed to present a pleasing appearance, and is of such construction that it may be readily and inexpensively manufactured. Moreover, movement of the secured portions relatively to each other may be provided for, if desired.

To this end, the invention consists in so combining the coöperating parts of effective fastener elements with the rigid body portions composing the fastener device, that when the latter is attached to the ends of the scarf a secure hold may be effected between the scarf ends, while allowing of ready detachment of the same from each other, when desired.

In the accompanying drawings, which indicate in general manner the method of carrying out the invention—

Figure 1 shows a scarf with the improved fastening device attached.

Fig. 2 is a plan of the fastening device; and Fig. 3 is a detail sectional view thereof.

Fig. 4 is a plan of a modified form of the fastening device; and Fig. 5 is a detail sectional view thereof.

Similar characters of reference designate corresponding parts throughout the several views.

Referring to the drawings, 10 designates a scarf, boa, fur piece, or the like, whose end portions 11 and 12 it is desired to unite to prevent the scarf ends from separating. In order to effect this in a positive and simple manner, the fastening device hereinafter described is secured to said end portions, preferably, through intermediate chain or other flexible members 13 and 14, which are secured in any well-known manner at the desired portion near the free ends of said scarf. The other ends of these flexible members have secured thereto the body portions 15 and 16 composing the fastening device, and which may be of any suitable and substantially rigid material.

In the embodiment illustrated in Figs. 1 to 3, these body portions are shown as spherically formed members; while in the embodiment illustrated in Figs. 4 and 5 the same are disclosed as flat plates 17 and 18, although it is understood that they may assume various shapes. In both instances, coöperating fastening elements are arranged to be securely held by the material of said body portions; and to this end, the same are shown as passing entirely through the walls thereof.

In the case of the spherical members, a stud 19 passes through the member 15 substantially at the pole thereof, its flanges embracing the said wall and thus effecting a positive securement. In similar manner, the member 16 carries a socket element 20, the two forming a so-called "snap fastener" of any well-known construction. This form of fastener allows also, as a rule, of movement of the two parts of the fastener relatively to each other.

When the flat body portions 17 and 18 are employed, as shown in Figs. 4 and 5, a button 21 is placed over the socket member 22 to conceal the one face of same. The stud member 23 of the plate 17 requires no covering of this nature, its one face being underneath the fastening device, and the other fitting within the socket member.

In thus positively holding the coöperating fastening elements within the material composing the fastener members, as by passing the same entirely through the walls thereof, the individual elements will not be pulled loose from the body portions in the separation of the fastener members, and are of such nature, furthermore, that they provide a most effective locking action.

I claim:

1. A fastener device for the ends of scarfs, including two substantially rigid body portions adapted to be attached thereto, and cooperating fastening elements passing through the respective body portions and held therein against withdrawal to secure said body portions to each other and thereby the end portions of the scarf.

2. A fastener device for the ends of scarfs, including two substantially rigid body portions adapted to be attached thereto, and snap fastener elements passing through the respective body portions and held therein against withdrawal to secure said body portions to each other and thereby the end portions of the scarf.

3. A fastener device for the ends of scarfs, including two spherically formed, substantially rigid body portions adapted to be attached thereto, and snap fastener elements passing through the respective spherically formed body portions and held therein substantially at the poles thereof to secure the said body portions to each other and thereby the end portions of the scarf.

Signed at New York in the county of New York and State of New York this 13th day of June, A. D. 1918.

JULIUS WARBURG.

Copies of this patent may be obtained for five cents each, by addressing the "Commissioner of Patents, Washington, D. C."